Aug. 17, 1954   G. B. HILL ET AL   2,686,658
TRAIL MOWER JACK

Filed May 11, 1951                    3 Sheets-Sheet 1

Inventors
George B. Hill
Melvin J. Happe

By *Allan R. Redrow*

Attorney

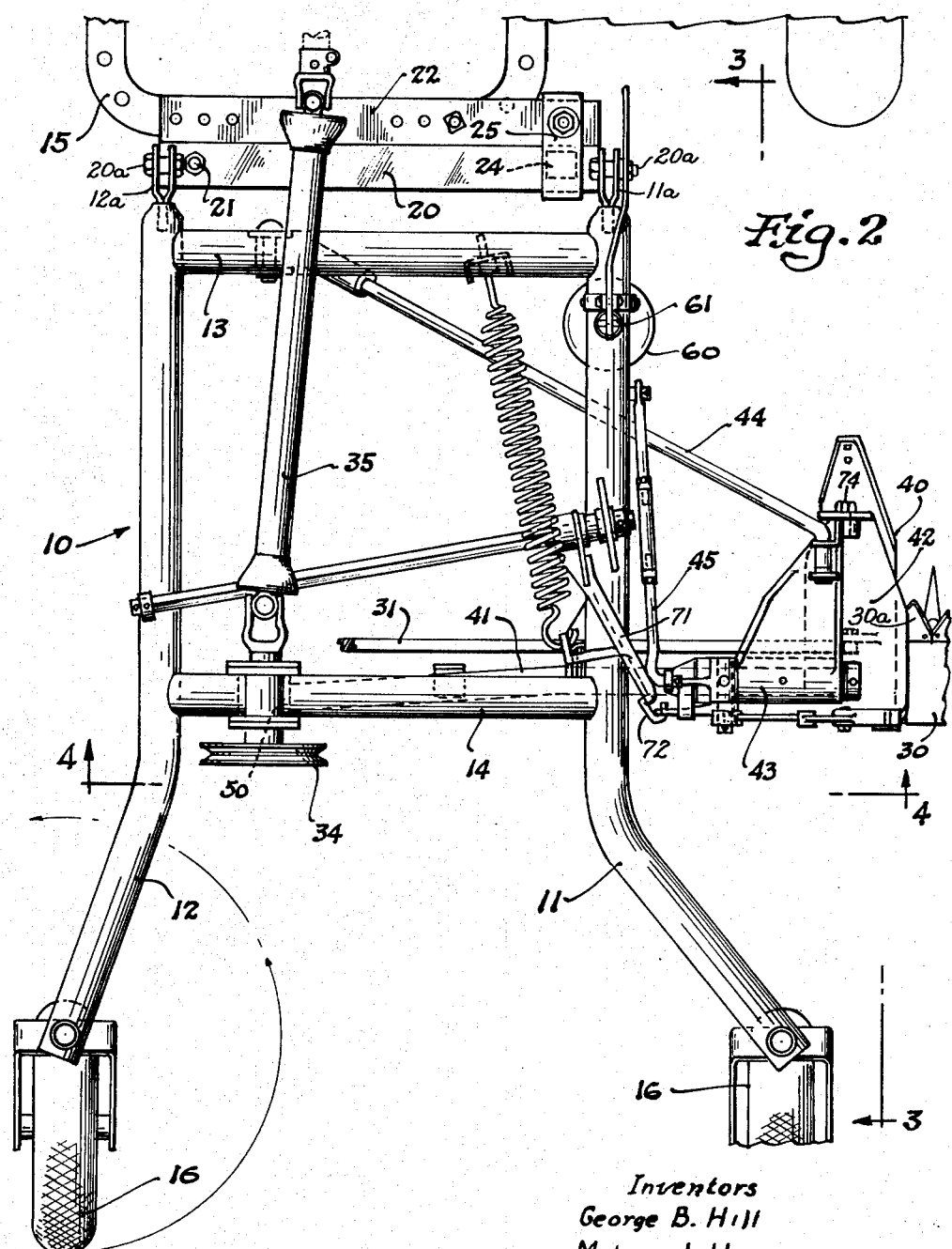

Aug. 17, 1954
G. B. HILL ET AL
2,686,658
TRAIL MOWER JACK
Filed May 11, 1951
3 Sheets-Sheet 3
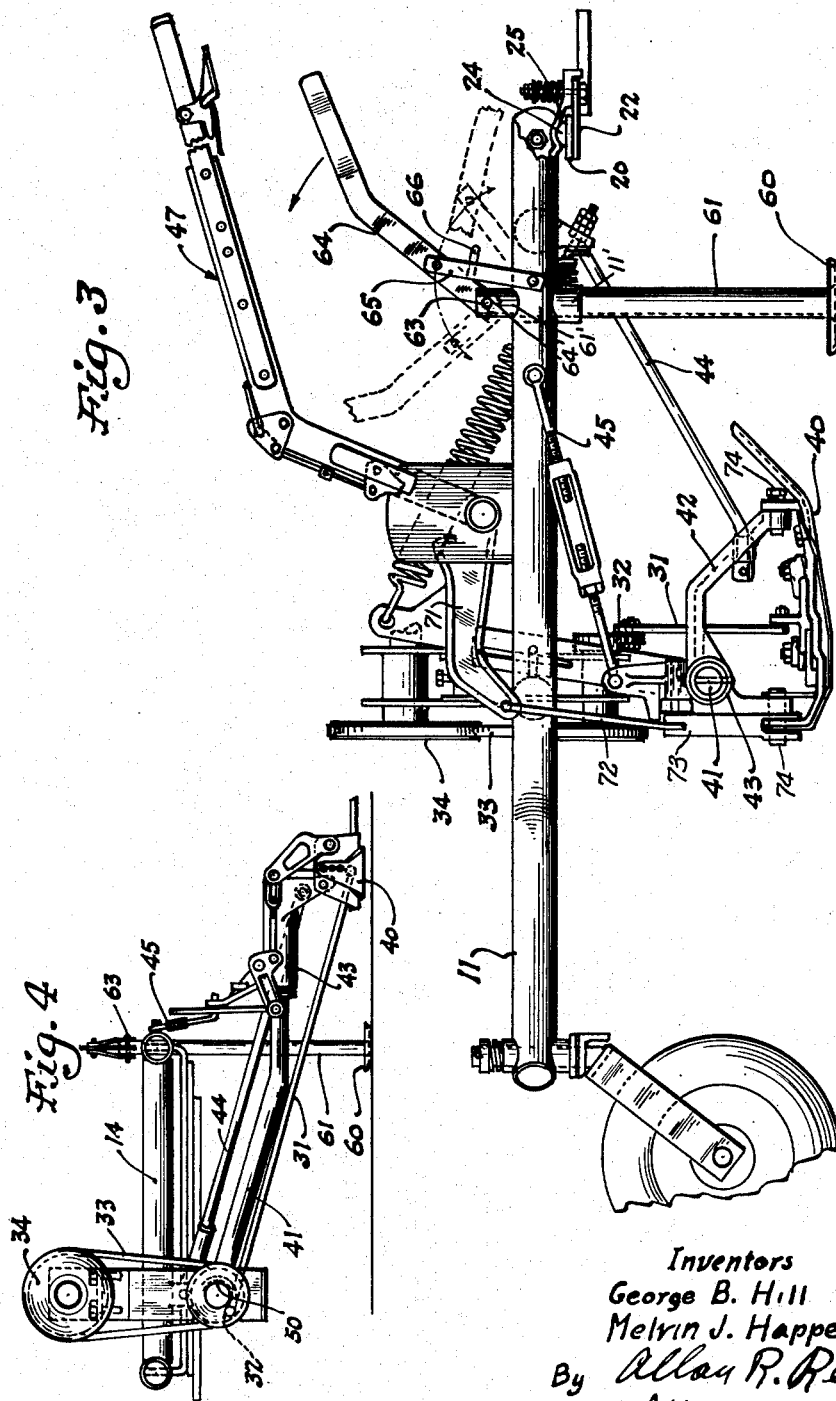
Inventors
George B. Hill
Melvin J. Happe
By Allan R. Redrow
Attorney Patented Aug. 17, 1954

2,686,658

UNITED STATES PATENT OFFICE 2,686,658

TRAIL MOWER JACK

George B. Hill and Melvin J. Happe, New Holland, Pa., assignors to New Holland Machine Division of The Sperry Corporation, New Holland, Pa., a corporation of Delaware Application May 11, 1951, Serial No. 225,892

2 Claims. (Cl. 254—114)

1

This invention relates to a mower for hay or grain or the like and more particularly is concerned with an improved trail type of mower machine.

Many types of mowers have been proposed in the past for use with tractors, such as mowers mounted or supported from the front end or side of the tractor, and mowers mounted to extend laterally from the rear of a tractor, the latter including the trail type mower with which the present invention is concerned.

The trail mower is more or less a self-contained unit and is supported on a wheeled frame that is adapted to be attached to the draw bar of a tractor so that in use the mower frame trails behind the tractor. This arrangement makes it possible to provide a convenient hook up between the power take-off of the tractor and the drive system for the sickle bar of the mower.

The mower frame of the present invention is supported at three points and is designed to be quickly attached and detached from the draw bar of a tractor. It is stable at all times and includes a built in jack at the front end that cooperates with the two wheels at the rear of the frame assembly, to assist in the storage of the machine and to position the front end of the frame at a convenient level for attachment to or removal from the draw bar of the tractor.

The tubular frame is of such a design as to hold the sickle bar of the mower solidly projected against the drag reaction produced in driving the sickle bar against the crop to be cut and the sickle bar support means includes a suitable push bar and bracing system that cooperates with the frame. An important feature of the invention resides in mounting the mower relatively fixedly on the push bar so that it can be raised and lowered with respect to the ground, the push bar swinging about an axis that coincides with the axis about which the crank rotates for driving the sickle pitman.

The preferred form of the invention is shown in the drawings wherein:

Figure 2 is a top plan view of the mower in Figure 1;

Figure 3 is a view taken on line 3—3 of Figure 2;

Figure 4 is a view taken on line 4—4 of Figure 2; and

Figure 1:
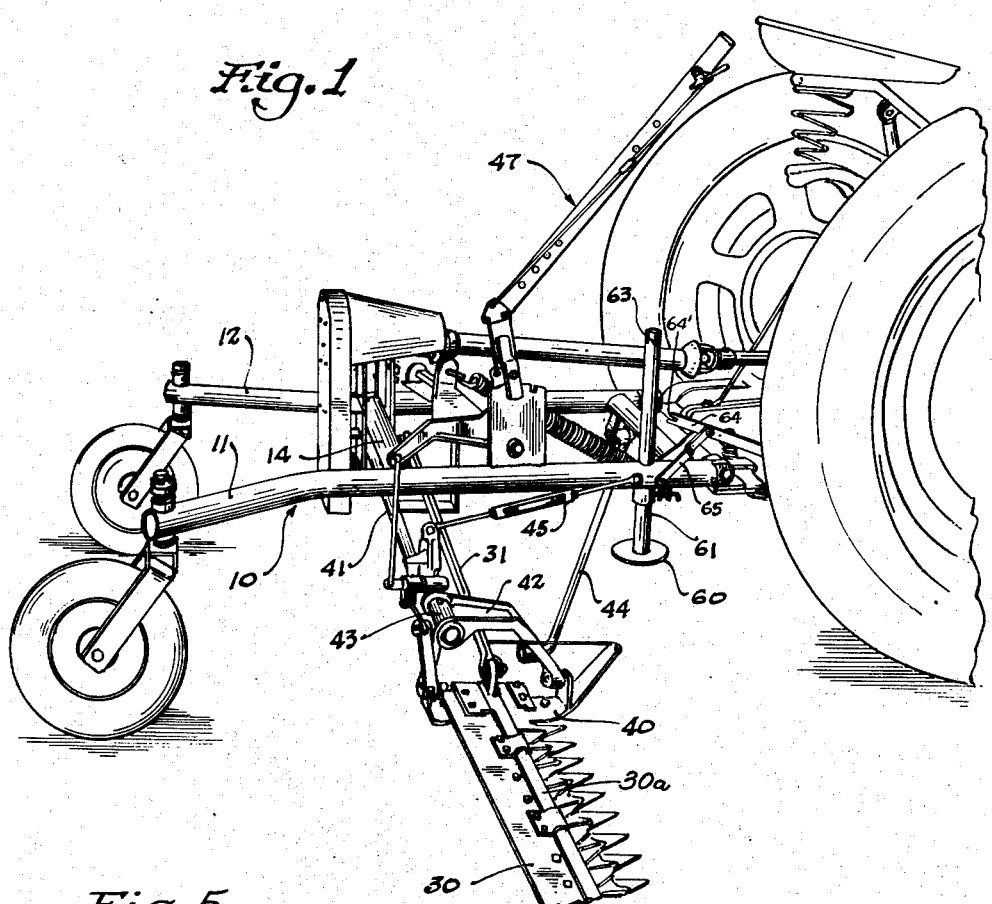
Figure 1 is a side perspective view showing the trail mower frame attached to a tractor.

Referring to Figure 1, the mowing machine is

2 shown as having a frame 10 formed with side bars 11 and 12 that are joined together by cross bars 13 and 14 as best seen in Figure 2. While the mower is in use, the frame 10 is adapted to be supported at its front end on the draw bar 15 of a tractor and at its rear end, the frame is carried upon the caster wheels 16 mounted at the tip of the rear ends of the side arms 11 and 12.

The front ends of each of the side arms 11 and 12 of the frame each have a yoke 11a—12a (Figure 2) that is adapted to be connected with the upwardly directed arms of the flat U-shaped member or cross bar 20 by means of horizontally disposed pivot pins 20a, the cross bar 20 being in turn pivotally connected at one end by the pivot pin 21 with a flat support plate 22. The other end of the cross-bar 20 is releasably latched to the support plate 22, the latch construction being provided for the purposes which will appear below. The detail structure of the latch is best seen in Figure 3 and includes an upwardly facing knob 24 integral with the upper surface of the cross-bar. The knob 24 is adapted to be engaged under the free end of a spring pressed catch member 25 carried on plate 22 and as shown in the drawings, plate 22 may be removably fixed to the draw bar of the tractor to support the front end of the frame when the machine is in use.

The mower structure for cutting the crop to be harvested is hung from the underside of the frame at approximately the middle point thereof and the sickle bar 30 projects laterally from the frame, on the same side as the latch means 24, 25, which connects the cross-bar to support plate 22. The sickle bar is of conventional design and includes a reciprocating sickle 30a which is reciprocated by means of a pitman 31 that is connected to a suitable drive crank 32. The crank 32 is in turn driven by the pulley that cooperates with a V-belt 33 carried on pulley 34 that is driven from an extensible drive shaft 35 connected to the power take-off of the tractor. The drive shaft has suitable universal joints integral therewith to permit the frame to move relative to the tractor while the shaft continuously transmits the driving force to the sickle drive means.

The mower means has a shoe 40 to which the sickle bar is pivotally connected at its inner end, the shoe being mounted on a bearing integral with the outer end of a push rod 41 in a manner such that it can be oscillated about the bearing to present the sickle bar to the crop at different cutting angles with respect thereto as is the usual practice. For mounting the shoe on the bearing, the shoe is provided with a yoke element 42 that extends upwardly from the shoe and is provided with a bearing 43 for engaging around the bearing formed on the end of the laterally projecting push arm 41. The shoe is also partially supported and held in a relatively fixed position by the pivotally mounted braces 44 and 45 which are connected between the yoke 42 and the frame 10 of the mower.

The sickle bar construction may be raised and lowered by means of a conventional lever system under control of a hand lever 47.

The push bar 41 that provides the primary support for the sickle bar, is supported at its inner end on a bearing 50 that is concentric with the axis of rotation for the drive shaft upon which crank 32 is mounted. The crank 32 is connected to the pitman 31 as explained above and thus, as the sickle bar is raised and lowered or as it rises and falls in following the contour of the soil, the pitman and push rod remain in exactly the same relationship with respect to the sickle bar.

After the machine has been hitched to the draw bar of a tractor by bolting the plate 22 on to the draw bar, the tractor may be driven to the field and the mower is made ready for use as explained above. The crop is cut as the mower is pulled through the field and the mowing continues until the sickle bar hits an obstruction. Upon approaching a rock or post or the like, if the tractor is not stopped quickly enough, then the sickle bar may engage it and is dragged back relatively until a sufficient force is exerted to lift the latch member 25 against its spring to permit the knob 24 to be pulled out from under this retaining member. As soon as the latch elements are uncoupled, the frame may swing back around pivot pin 21 so that the sickle bar is thus allowed to pass around any obstruction against which it may engage. After the frame has been opened up after the sickle bar hits an obstruction, it is necessary to back the tractor up in order to close the plate 22 against cross-bar 20 and engage the knob 24 under latch member 25 to return the frame to its proper trailing position behind the tractor whereupon, if the obstacle has not been passed, the sickle may be raised and moved around the obstruction whereupon, the sickle may again be lowered and the mowing operation resumed. It is to be noted that the drive from the power take-off to the sickle bar is continuous even though the frame may be swung back around pivot pin 21 so that the mower cannot become jammed or clogged up by an accumulation of uncut material while the frame is swung back.

It is important to note that as the frame breaks around the pivot pin 21, the extensible drive connection 35 is swung about the power take-off point as a center. Due to a rather close positioning of the power take-off with respect to pin 21, the drive shaft 35 passes over the pin 21 as the frame swings back. This close positioning of the pivot pin 21 with respect to the power take-off, permits the use of a very short drive shaft because of the fact that after the drive shaft passes over the pivot pin, the relationship of the parts is such that the shaft no longer is caused to stretch out, but actually shortens up again and therefore a predetermined relatively short extension of the drive shaft is all that need be provided for. This is advantageous in that the sickle bar may be moved in closer behind the rear wheels of the tractor and thus, the frame of the trail mower can be considerably shortened.

Figure 5:
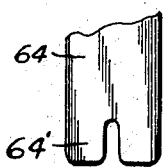
Figure 5 is an enlarged fragmentary side elevation of the lower end of the jack actuating lever.

After the mowing operation has been completed, the mower may be towed to its storage space and then the jack 60 is dropped so that its pad engages the surface upon which the frame is to be supported. The jack includes an upright standard 61 that passes through a suitable slide bearing 11' provided at the front end of the side member 11. The standard 61 is of a length to reach the surface for supporting the frame and extends upwardly through the side member 11 for a suitable distance as is best shown in Figure 3. The upper end 61' of the standard is slotted in a direction parallel with the longitudinal direction of the side member 11 and a pin 63 is fixedly secured across the slot in the standard for engagement with the forked end 64' (Figure 5) of a lever 64. Lever 64 is pivotally mounted at the upper end of the yoke 65 which in turn is pivotally mounted on the side member 11 closely adjacent to the bearing through which standard 61 may be raised and lowered.

The relative position of the lever 64 and yoke 65 with respect to the slide bearing 11' in side member 11, is such that, as shown in Figure 3, the forked end of the lever may be passed into the slot and engaged on pin 63. The lever may then be raised from the dotted line position to the full line position, moving in the direction of the arrow as indicated in Figure 3, and in so moving, the lever 64 passes over the center of the standard 61 until the stirrup 66 engages against lever 64 to limit the downward motion of the lever to the dotted line position shown at the left in Figure 3. This lifting lever arrangement makes available a sufficient leverage to lift the load of the frame onto the standard 61, and because the lever has passed over the center, the standard and lever will remain locked together until the lever is lifted in the reverse direction to drop the frame and release the standard. This construction provides a very quick arrangement for lifting the front end of the mower from the draw bar so that a very quick attachment can be made without requiring any heavy manual lifting on the part of the operator. It is to be noted, that after the mower has been attached to the tractor draw bar, the jack can be lifted and latched in an out-of-the-way position.

The above description covers the preferred form of this invention. Many modifications thereof may occur to those skilled in the art which will fall within the scope of the following claims.

We claim:

1. A jack comprising a rigid standard having a supporting base, a lever fulcrumed on the upper end of said standard for swinging movement parallel thereto through a position of endwise alignment with said standard, a rigid frame having a bearing slidably receiving said standard to permit movement of said frame lengthwise of said standard, a yoke pivotally connected under tension between said frame and said lever and suspending said frame from the lever, and stop means carried by said yoke for engagement with said standard for interrupting the swinging movement of the lever when the latter has swung through a position of endwise alignment with said standard and beyond a position in which the said fulcrum is aligned with the pivotal connections of said yoke.

2. The combination defined in claim 1 in which said standard is formed with an endwise slot, a pin being secured across said slot, and the lever is provided with a bifurcated end insertable into said slot about said pin to provide a removable fulcrum connection between the standard and lever.

References Cited in the file of this patent

UNITED STATES PATENTS

| Number | Name | Date |
|---|---|---|
| 631,806 | Mendenhall | Aug. 29, 1899 |
| 1,204,162 | Kirstaetter | Nov. 7, 1916 |
| 1,825,702 | Newton | Oct. 6, 1931 |
| 1,887,352 | Huddle | Nov. 8, 1932 |
| 1,923,952 | Pearson | Aug. 22, 1933 |
| 1,946,544 | Paul | Feb. 13, 1934 |
| 2,198,910 | Everett | Apr. 30, 1940 |
| 2,225,156 | Coultas | Dec. 17, 1940 |
| 2,248,332 | Budelier et al. | July 8, 1941 |
| 2,454,697 | Hilblom | Nov. 23, 1948 |
| 2,520,744 | Charley | Aug. 29, 1950 |
| 2,554,198 | Kuhlman | May 22, 1951 |

FOREIGN PATENTS

| Number | Country | Date |
|---|---|---|
| 93,378 | Switzerland | Mar. 1, 1922 |